(12) United States Patent
Chen et al.

(10) Patent No.: US 12,242,677 B1
(45) Date of Patent: Mar. 4, 2025

(54) FULL-AREA TOUCH DEVICE

(71) Applicant: SUNREX TECHNOLOGY CORP., Taichung (TW)

(72) Inventors: Chun-Chieh Chen, Taichung (TW); Ling-Cheng Tseng, Taichung (TW)

(73) Assignee: SUNREX TECHNOLOGY CORP., Taichung (TW)

( * ) Notice: Subject to any disclaimer, the term of this patent is extended or adjusted under 35 U.S.C. 154(b) by 0 days.

(21) Appl. No.: 18/625,841

(22) Filed: Apr. 3, 2024

(30) Foreign Application Priority Data

Jan. 9, 2024 (TW) ................................ 113100906

(51) Int. Cl.
*G06F 3/041* (2006.01)
*G06F 3/0354* (2013.01)

(52) U.S. Cl.
CPC .............................. *G06F 3/03547* (2013.01)

(58) Field of Classification Search
CPC .... G06F 1/169; G06F 3/0354; G06F 3/03547; G06F 3/041; G06F 3/0414
See application file for complete search history.

(56) References Cited

U.S. PATENT DOCUMENTS

| | | | |
|---|---|---|---|
| 11,340,719 B1* | 5/2022 | Lin | G06F 3/03547 |
| 2012/0103773 A1* | 5/2012 | Villain | G06F 3/03547 |
| | | | 200/344 |
| 2015/0243457 A1* | 8/2015 | Niu | H01H 13/46 |
| | | | 156/247 |
| 2019/0243475 A1* | 8/2019 | Huang | G06F 1/1681 |
| 2019/0243476 A1* | 8/2019 | Chen | H01H 3/122 |
| 2019/0391656 A1* | 12/2019 | Togawa | G06F 3/042 |
| 2020/0273641 A1* | 8/2020 | Lu | H01H 13/83 |
| 2020/0328044 A1* | 10/2020 | Chao | H01H 13/705 |
| 2021/0263556 A1* | 8/2021 | Degner | G06F 3/04883 |
| 2022/0035405 A1* | 2/2022 | Lin | G06F 1/1622 |
| 2022/0066580 A1* | 3/2022 | Lin | G06F 3/03547 |

* cited by examiner

*Primary Examiner* — Joe H Cheng

(74) *Attorney, Agent, or Firm* — Muncy, Geissler, Olds & Lowe, P.C.

(57) ABSTRACT

A full-area touch device includes a linkage unit disposed between a base unit and a touch control unit to drive a trigger switch of the touch control unit to be triggered by the base unit. The linkage unit is symmetrical relative to the trigger switch and includes an outer frame, an inner frame, linkage members fixed between the outer and inner frames, and a left plate and a right plate fixed to the base unit in the inner frame. A left front linkage member and a left rear linkage member are fixed between the left plate and the inner frame. A right front linkage member and a right rear linkage member are fixed between the right plate and the inner frame. A portion of an outer frame space not occupied by the base unit, the inner frame, the left plate and the right plate is defined as a floating chamber.

5 Claims, 8 Drawing Sheets

FULL-AREA TOUCH DEVICE

CROSS-REFERENCE TO RELATED APPLICATION

This application claims priority to Taiwanese Invention Patent Application No. 113100906, filed on Jan. 9, 2024, the entire disclosure of which is incorporated by reference herein.

FIELD

The disclosure relates to an input device adapted for a computer, and more particularly to a full-area touch device adapted for a laptop computer.

BACKGROUND

A laptop computer is configured to have a touchpad as an alternative to a mouse. The touchpad has a function to control a cursor operation by detecting finger movement or finger pressing of a user.

An existing touchpad includes a base plate and a touch-sensing plate disposed above the base plate. The touch-sensing plate has a pivotal side pivoted to the base plate. When a portion of the touch-sensing plate distal from the pivotal side is pressed, the touch-sensing plate is pivotally rotated about the pivotal side serving as an axis to move downwardly and be triggered by the base plate, thereby generating a corresponding signal.

However, when the pivotal side or a portion adjacent to the pivotal side of the touch-sensing plate is pressed, the touch-sensing plate may not satisfactorily move downwardly and not be triggered by the base plate, so the existing touchpad may not generate a corresponding signal. In other words, a trigger region of the existing touchpad is limited, thereby causing an unfavorable operation.

SUMMARY

Therefore, an object of the disclosure is to provide a full-area touch device that can alleviate at least one of the drawbacks of the prior art.

According to the disclosure, the full-area touch device includes a base unit, a touch control unit, and a linkage unit.

The base unit has a trigger portion.

The touch control unit is disposed over the base unit, and includes a touch plate, a circuit board, and a trigger switch. The circuit board is connected to a bottom side of the touch plate and has a circuit board bottom surface opposite to the touch plate. The trigger switch is disposed on the circuit board bottom surface, is aligned with the trigger portion, and is configured to be triggered by the trigger portion.

The linkage unit is disposed between the base unit and the touch control unit, is symmetrical in a front-rear direction and a left-right direction relative to the trigger switch, and includes an outer frame, an inner frame, a first linkage set, a left plate, a right plate, and a second linkage set. The outer frame defines an outer frame space, and has a top outer frame surface connected fixedly to the circuit board bottom surface, and a bottom outer frame surface opposite to the top outer frame surface. The inner frame is flexible, is disposed in the outer frame space, defines an inner frame space, and has a top inner frame surface and a bottom inner frame surface opposite to the top inner frame surface. A thickness of the inner frame between the top inner frame surface and the bottom inner frame surface is smaller than a thickness of the outer frame between the top outer frame surface and the bottom outer frame surface. The first linkage set has a plurality of linkage members fixed between the bottom outer frame surface and the bottom inner frame surface. The left plate is flexible, is fixed to the base unit, and is disposed in the inner frame space. The right plate is flexible, is fixed to the base unit opposite to the left plate, and is disposed in the inner frame space. The second linkage set has a left front linkage member, a left rear linkage member, a right front linkage member, and a right rear linkage member. The left front linkage member and the left rear linkage member are fixed between the left plate and the bottom inner frame surface. The right front linkage member and the right rear linkage member are fixed between the right plate and the bottom inner frame surface.

A gap is formed between the top inner frame surface and the circuit board bottom surface.

The outer frame space and the inner frame space communicate with each other.

A portion of the outer frame space not occupied by the base unit, the inner frame, the left plate, and the right plate is defined as a floating chamber.

The touch control unit is movable relative to the base unit, via operation of the linkage unit, between an upper position where the trigger switch is not triggered by the trigger portion, and a lower position where the trigger switch is triggered by the trigger portion.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly"

and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
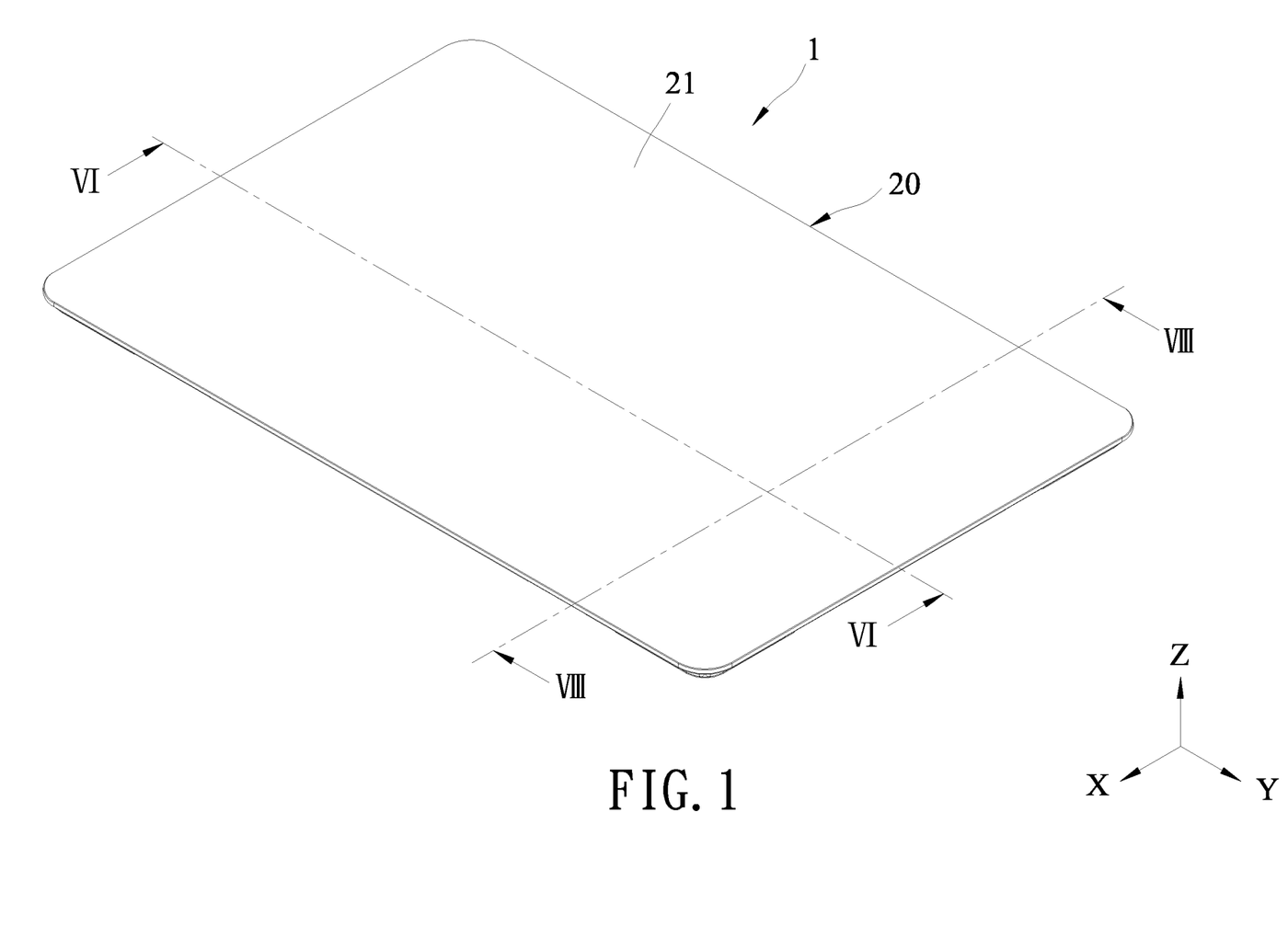
FIG. 1 is a top perspective schematic view illustrating a full-area touch device according to an embodiment of the disclosure.
Figure 2:
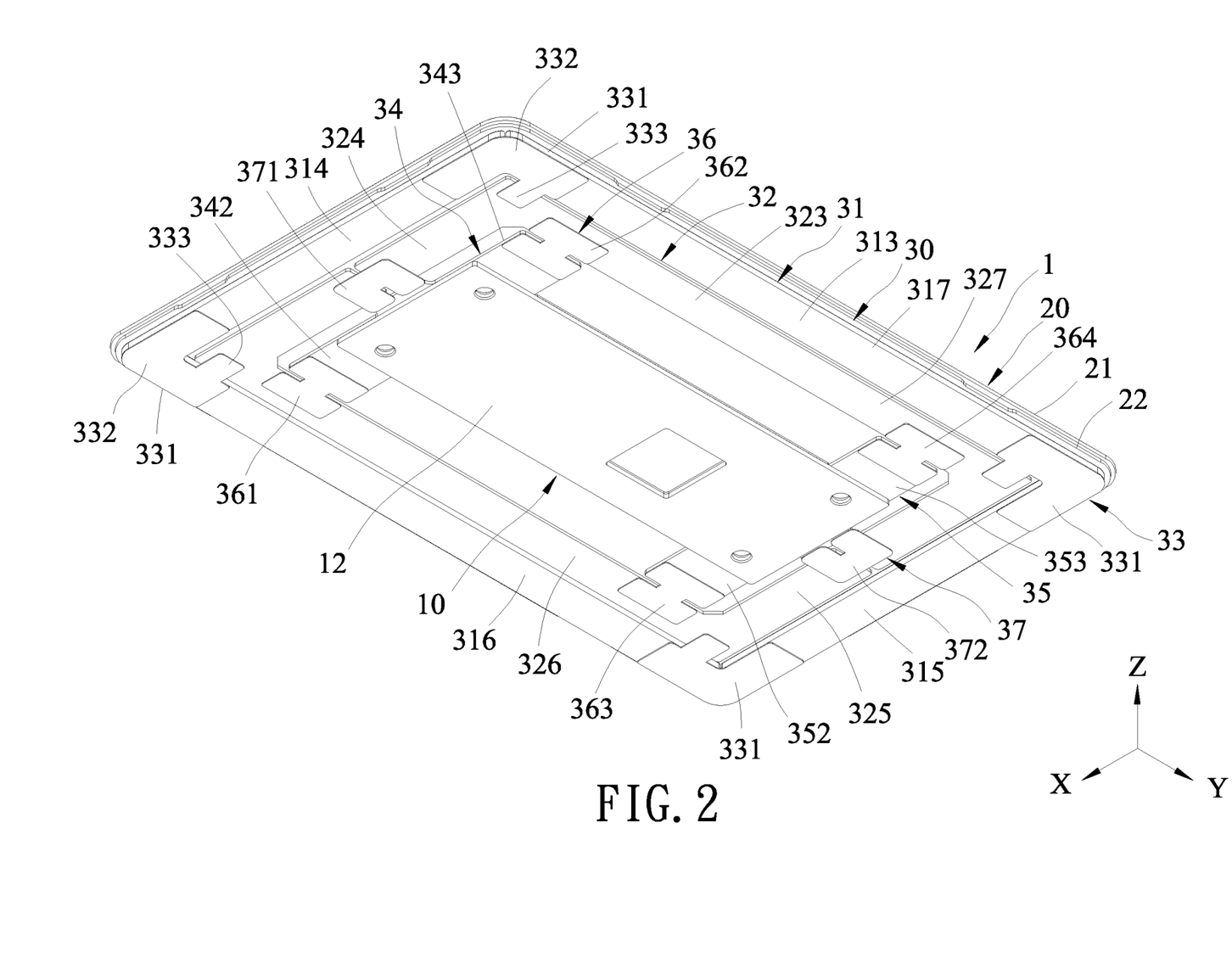
FIG. 2 is a bottom perspective schematic view of the embodiment.
Figure 3:
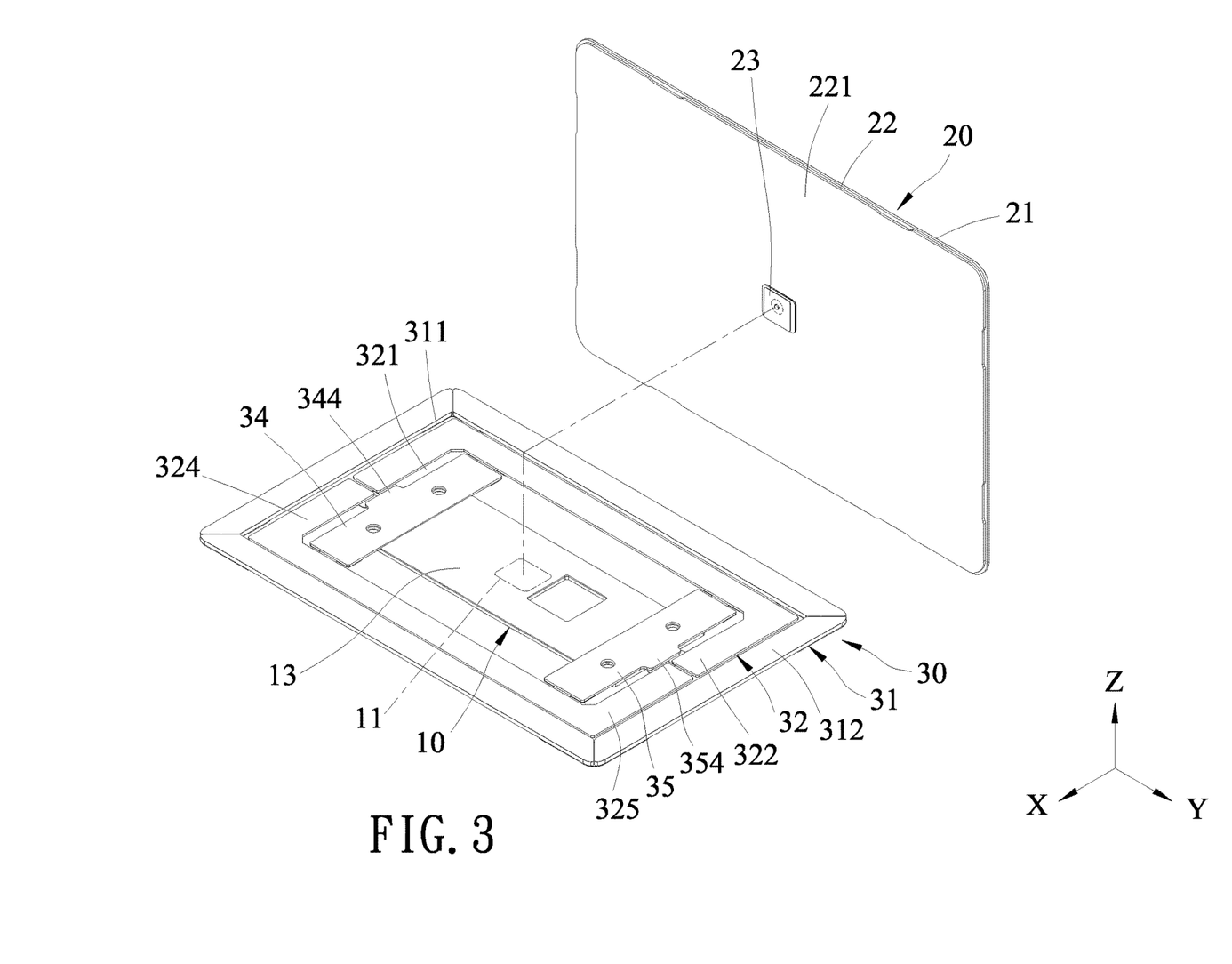
FIG. 3 is a partly exploded perspective view of the embodiment illustrating a base unit, a touch control unit, and a linkage unit of the full-area touch device.

FIGS. 1 to 3 illustrate a full-area touch device 1 according to an embodiment of the disclosure adapted to be installed to a keyboard casing (not shown) of a laptop computer. The full-area touch device 1 of the disclosure includes a base unit 10, a touch control unit 20, and a linkage unit 30.

Referring to FIGS. 2 to 5, the base unit 10 is fixedly connected to the keyboard casing (not shown), and includes a base plate 12 and an intermediate plate 13. The base plate 12 is elongated in a left-right direction (Y). The intermediate plate 13 is fixed to the base plate 12 and has a trigger portion 11. A length of the intermediate plate 13 in the left-right direction (Y) is smaller than a length of the base plate 12 in the left-right direction (Y).

Figure 6:
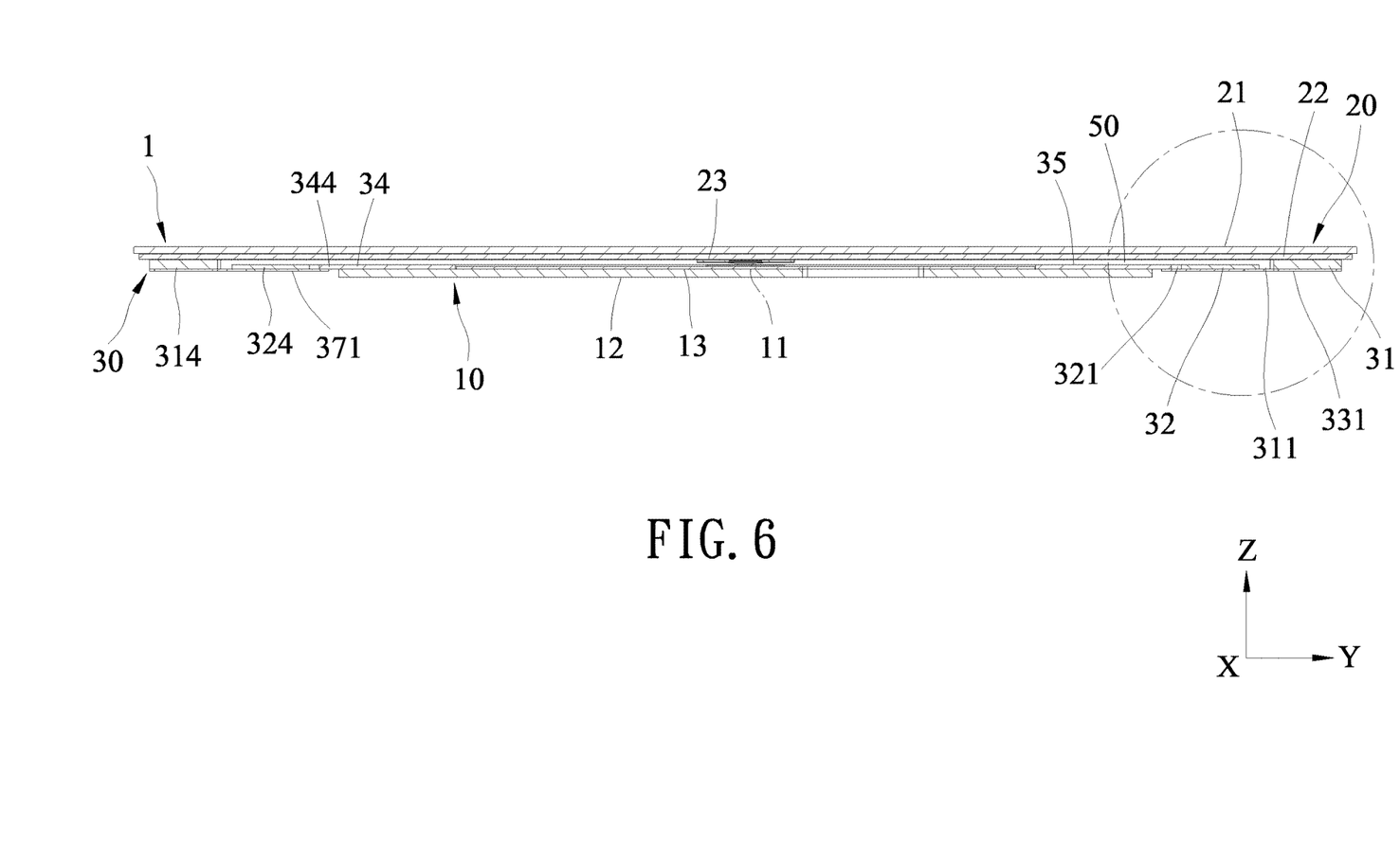
FIG. 6 is a sectional schematic view taken along line VI-VI from FIG. 1.

Referring to FIG. 6 in combination with FIGS. 1 and 3, the touch control unit 20 is disposed over the base unit 10 in a top-bottom direction (Z), and includes a touch plate 21, a circuit board 22, and a trigger switch 23. The circuit board 22 is connected to a bottom side of the touch plate 21 and has a circuit board bottom surface 221 opposite to the touch plate 21. The trigger switch 23 is disposed on the circuit board bottom surface 221, is aligned with the trigger portion 11, and is configured to be triggered by the trigger portion 11 so as to generate a signal. A trigger distance of the trigger switch 23 may be fine-tuned by changing a thickness of the intermediate plate 13.

Figure 4:
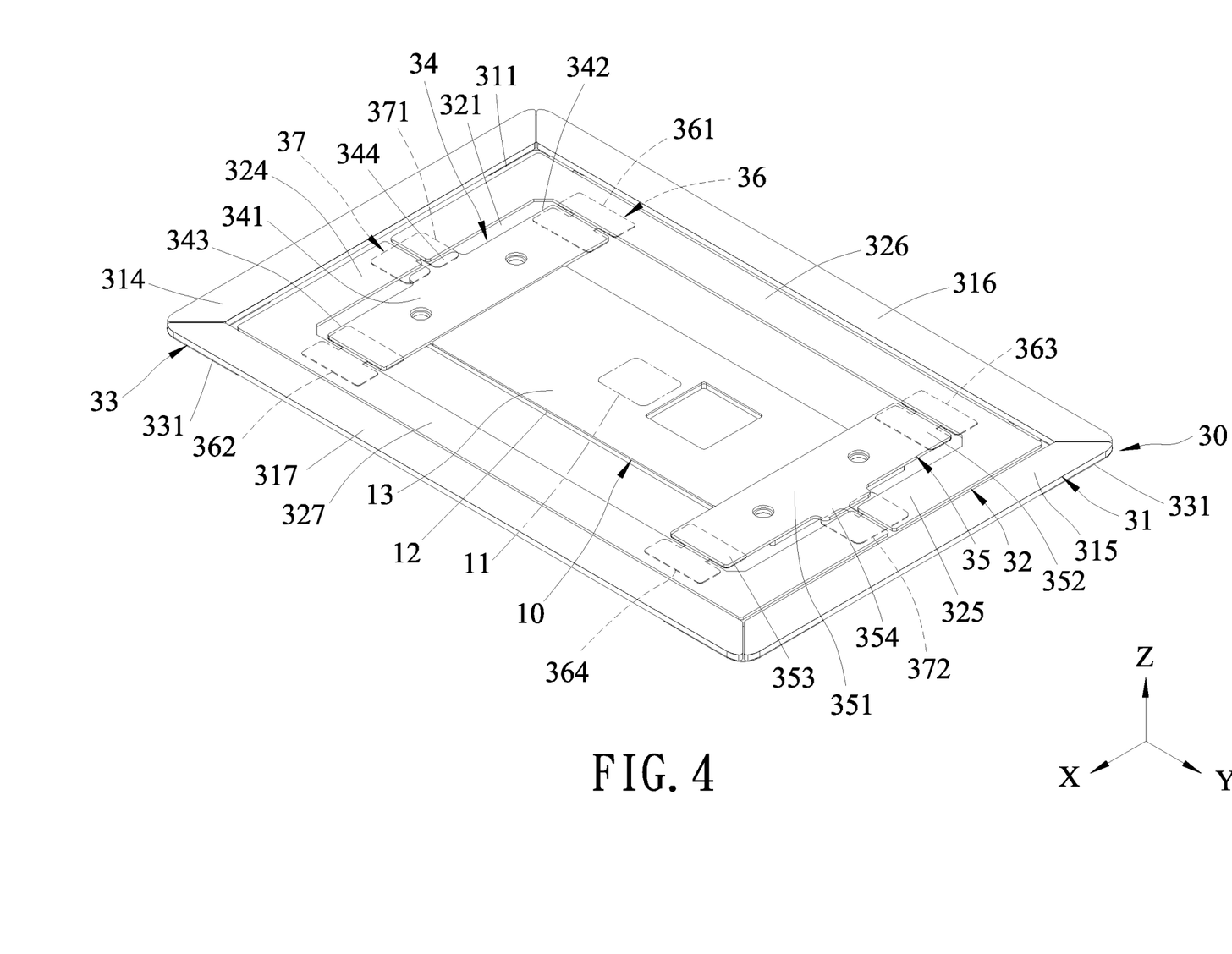
FIG. 4 is a fragmentary perspective view of the embodiment illustrating the base unit and the linkage unit being assembled with each other.

Referring to FIGS. 2 to 4, the linkage unit 30 is disposed between the base unit 10 and the touch control unit 20, and is symmetrical in a front-rear direction (X) and the left-right direction (Y) relative to the trigger switch 23. In this embodiment, the linkage unit 30 includes an outer frame 31, an inner frame 32, a first linkage set 33, a left plate 34, a right plate 35, a second linkage set 36, and a retaining set 37.

Figure 5:
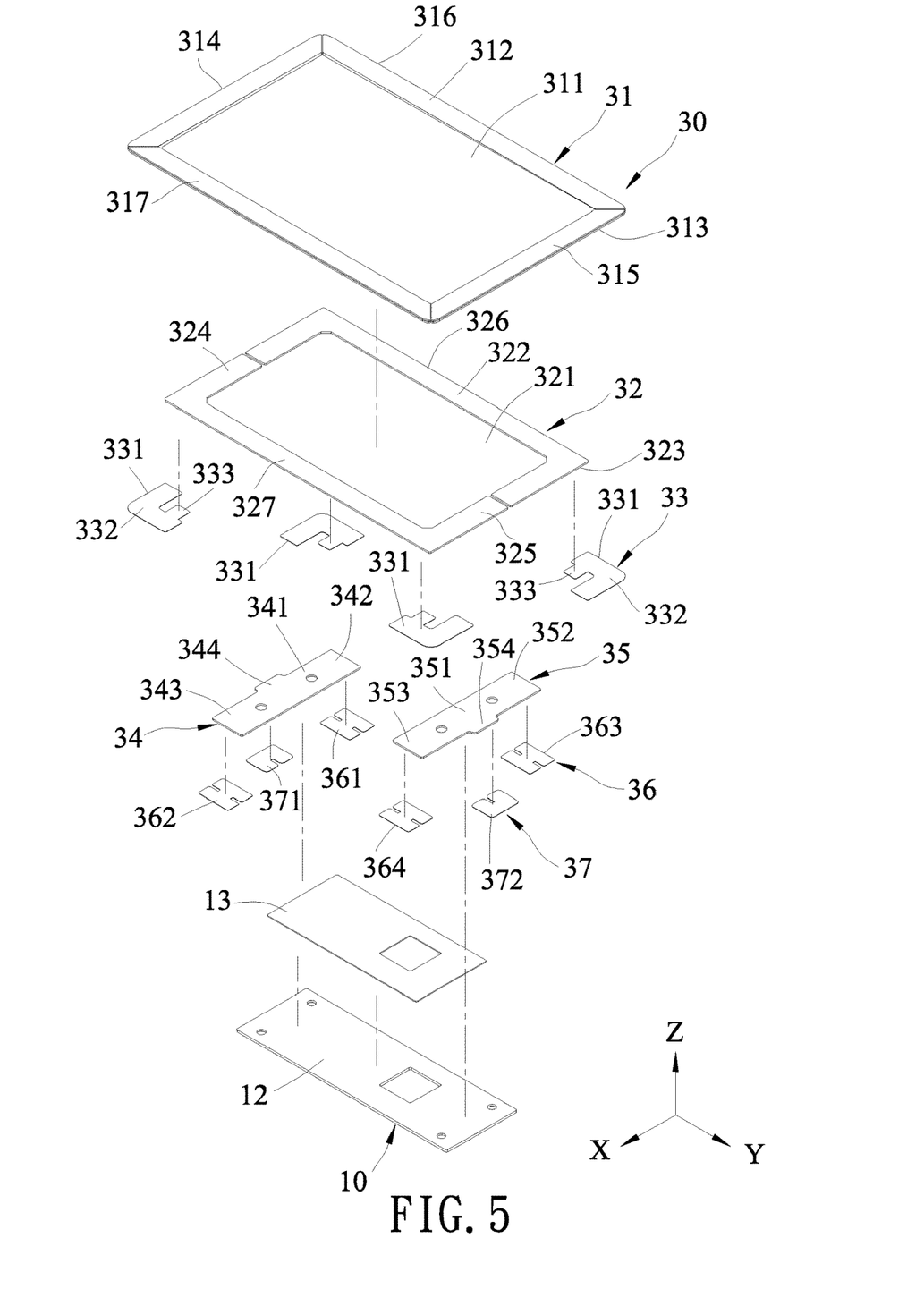
FIG. 5 is a fragmentary exploded perspective view of the embodiment illustrating the base unit and the linkage unit.

As shown in FIGS. 2, 3, and 5, the outer frame 31 defines an outer frame space 311, and has a top outer frame surface 312 and a bottom outer frame surface 313 opposite to the top outer frame surface 312. The top outer frame surface 312 is connected fixedly to a periphery of the circuit board bottom surface 221.

A shape of the outer frame 31 conforms to shapes of the touch plate 21 and the circuit board 22, and may be a single rectangular frame. In this embodiment, the touch plate 21 and the circuit board 22 are rectangular. The outer frame 31 is rectangular and is composed of a left outer plate 314, a right outer plate 315, a front outer plate 316, and a rear outer plate 317. Top surfaces of the left outer plate 314, the right outer plate 315, the front outer plate 316, and the rear outer plate 317 cooperatively form the top outer frame surface 312. Bottom surfaces of the left outer plate 314, the right outer plate 315, the front outer plate 316, and the rear outer plate 317 cooperatively form the bottom outer frame surface 313.

As shown in FIGS. 3 to 5, the inner frame 32 is symmetrical in the front-rear direction (X) and the left-right direction (Y) relative to the trigger switch 23. The inner frame 32 is flexible, is disposed in the outer frame space 311, defines an inner frame space 321, and has a top inner frame surface 322 and a bottom inner frame surface 323 opposite to the top inner frame surface 322.

The inner frame 32 is rectangular and includes a front inner frame plate 326 and a rear inner frame plate 327, and a left inner frame plate 324 and a right inner frame plate 325 interconnecting the front inner frame plate 326 and the rear inner frame plate 327. Top surfaces of the front inner frame plate 326, the rear inner frame plate 327, the left inner frame plate 324, and the right inner frame plate 325 cooperatively form the top inner frame surface 322. Bottom surfaces of the front inner frame plate 326, the rear inner frame plate 327, the left inner frame plate 324, and the right inner frame plate 325 cooperatively form the bottom inner frame surface 323.

In this embodiment, the inner frame 32 is composed of a front half frame set and a rear half frame set. In some other embodiments, the inner frame 32 may be a single rectangular frame.

Figure 7:
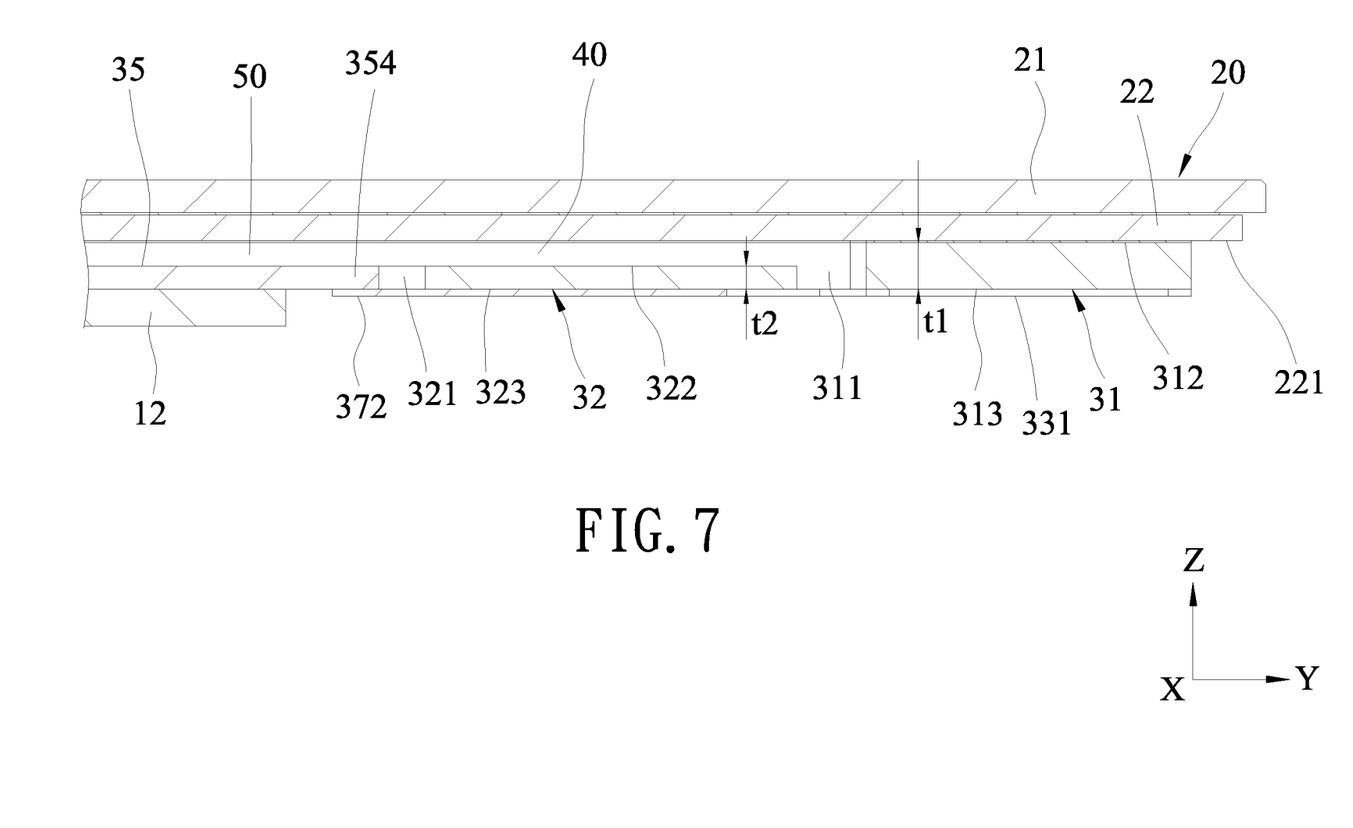
FIG. 7 is an enlarged fragmentary sectional view taken from a circle shown in FIG. 6 illustrating how a floating chamber of the full-area touch device is defined.

Referring to FIGS. 6 and 7 in combination with FIG. 1, a thickness (t2) of the inner frame 32 between the top inner frame surface 322 and the bottom inner frame surface 323 is smaller than a thickness (t1) of the outer frame 31 between the top outer frame surface 312 and the bottom outer frame surface 313.

As shown in FIGS. 2, 4, and 5, the first linkage set 33 has a plurality of linkage members 331 fixed between the bottom outer frame surface 313 and the bottom inner frame surface 323. In this embodiment, the number of the linkage members 331 is four. Each of the linkage members 331 has a corner portion 332 and a protrusion portion 333. The corner portion 332 of each of the linkage members 331 is fixed to a respective one of corner portions of the bottom outer frame surface 313. For each of the linkage members 331, the protrusion portion 333 protrudes from the corner portion 332 and is fixed to the bottom inner frame surface 323. The linkage members 331 are located symmetrically with respect to the trigger switch 23 and the trigger portion 11 in the front-rear direction (X) and the left-right direction (Y).

As shown in FIGS. 2, 6, and 7, by virtue of the linkage members 331 of the first linkage set 33 being fixed between the bottom outer frame surface 313 and the bottom inner frame surface 323, the outer frame 31 and the inner frame 32 are connected to each other. Because the thickness (t2) of the inner frame 32 is smaller than the thickness (t1) of the outer frame 31, a gap 40 is formed between the top inner frame surface 322 and the circuit board bottom surface 221, and the outer frame space 311 and the inner frame space 321 communicate with each other. Further, a portion of the outer frame space 311 not occupied by the base unit 10, the inner frame 32, the left plate 34, and the right plate 35 is defined as a floating chamber 50.

As shown in FIGS. 4 and 5, the left plate 34 is flexible, is fixed to the base plate 12 of the base unit 10, and is disposed in the inner frame space 321. The left plate 34 is elongated in the front-rear direction (X) and is adjacent to the left inner frame plate 324. In this embodiment, the left plate 34 has a left plate intermediate portion 341, a left plate front portion 342, a left plate rear portion 343, and a left plate limiting portion 344. The left plate intermediate portion 341 is fixed to a left side of the base plate 12. The left plate front portion 342 extends from the left plate intermediate portion 341 toward the front inner frame plate 326, and protrudes outwardly of the base plate 12. The left plate rear portion 343 extends from the left plate intermediate portion 341 toward the rear inner frame plate 327, and protrudes outwardly of the base plate 12. The left plate limiting portion 344 extends from the left plate intermediate portion 341 toward the left inner frame plate 324, and protrudes outwardly of the base plate 12.

The right plate 35 is flexible, is fixed to the base plate 12 opposite to the left plate 34, and is disposed in the inner frame space 321. The right plate 35 is elongated in the front-rear direction (X) and is disposed adjacent to the right inner frame plate 325. In this embodiment, the right plate 35 has a right plate intermediate portion 351, a right plate front portion 352, a right plate rear portion 353, and a right plate limiting portion 354. The right plate intermediate portion 351 is fixed to the base plate 12. The right plate front portion 352 extends from the right plate intermediate portion 351 toward the front inner frame plate 326, and protrudes outwardly of the base plate 12. The right plate rear portion 353 extends from the right plate intermediate portion 351 toward the rear inner frame plate 327, and protrudes outwardly of the base plate 12. The right plate limiting portion 354 extends from the right plate intermediate portion 351 toward the right inner frame plate 325 and protrudes outwardly of the base plate 12.

The left plate 34 and the right plate 35 are symmetrical to each other in the left-right direction (Y) about the trigger portion 11. A thickness of the left plate 34 is identical to a thickness of the right plate 35. The left plate 34 and the right plate 35 are respectively in contact with a left side and a right side of the intermediate plate 13 of the base unit 10.

As shown in FIGS. 2, 4, and 5, the second linkage set 36 has a left front linkage member 361, a left rear linkage member 362, a right front linkage member 363, and a right rear linkage member 364. The left front linkage member 361 and the left rear linkage member 362 are fixed between the left plate 34 and the bottom inner frame surface 323. The right front linkage member 363 and the right rear linkage member 364 are fixed between the right plate 35 and the bottom inner frame surface 323. In this embodiment, the left front linkage member 361 of the second linkage set 36 is fixed between a left part of the front inner frame plate 326 and the left plate front portion 342. The left rear linkage member 362 of the second linkage set 36 is fixed between a left part of the rear inner frame plate 327 and the left plate rear portion 343. The right front linkage member 363 of the second linkage set 36 is fixed between a right part of the front inner frame plate 326 and the right plate front portion 352. The right rear linkage member 364 of the second linkage set 36 is fixed between a right part of the rear inner frame plate 327 and the right plate rear portion 353.

The retaining set 37 includes a left retaining member 371 and a right retaining member 372. The left retaining member 371 is fixedly connected to an underside of the left inner frame plate 324 and is disposed under the left plate limiting portion 344. The right retaining member 372 is fixedly connected to an underside of the right inner frame plate 325 and is disposed under the right plate limiting portion 354.

As shown in FIGS. 1, 4, and 6, when assembly of the full-area touch device 1 is completed, the touch control unit 20 is movable relative to the base unit 10, via operation of the linkage unit 30, between an upper position where the trigger switch 23 is not triggered by the trigger portion 11, and a lower position where the trigger switch 23 is triggered by the trigger portion 11.

When the touch plate 21 is pressed, the touch control unit 20 and the linkage unit 30 are driven to move together with each other downwardly toward the base unit 10. When the touch control unit 20 moves to the lower position relative to the base unit 10, the trigger switch 23 is triggered by the trigger portion 11 to generate a signal.

Operation and technical effects of the full-area touch device 1 will be further described in details below.

As shown in FIGS. 1, 4, and 5, when a right side of the touch plate 21 is pressed, the right outer plate 315 and right regions of the front outer plate 316 and the rear outer plate 317 are driven to move downwardly relative to the base unit 10. Because the outer frame 31 and the inner frame 32 are connected by the first linkage set 33, the right inner frame plate 325 and the right parts of the front inner frame plate 326 and the rear inner frame plate 327 are driven by the outer frame 31 to move downwardly relative to the base unit 10 in such a manner that the right parts of the front inner frame plate 326 and the rear inner frame plate 327 are deformed to bend downwardly. Meanwhile, the right retaining member 372 is driven by the right inner frame plate 325 to move away from the right plate limiting portion 354 of the right plate 35. The right front linkage member 363 of the second linkage set 36 fixed between the right part of the front inner frame plate 326 and the right plate front portion 352 may serve as a right front fulcrum, and the right rear linkage member 364 of the second linkage set 36 fixed between the right part of the rear inner frame plate 327 and the right plate rear portion 353 may serve as a right rear fulcrum. While the left inner frame plate 324 and the left parts of the front inner frame plate 326 and the rear inner frame plate 327 tend to move upwardly and distantly from the base unit 10, because the left front linkage member 361 of the second linkage set 36 fixed between the left part of the front inner frame plate 326 and the left plate front portion 342 of the left plate 34 may serve as a left front fixing point, and because the left rear linkage member 362 of the second linkage set 36 fixed between the left part of the rear inner frame plate 327 and the left plate rear portion 343 of the left plate 34 may serve as a left rear fixing point, upward movements of the left inner frame plate 324 and the left parts of the front inner frame plate 326 and the rear inner frame plate 327 are prevented by the left front linkage member 361 and the left rear linkage member 362 so as to prevent an upward movement of a left side of touch plate 21, thereby limiting the touch control unit 20 from wobbling leftward and rightward. As the touch control unit 20 moves to the lower position, the trigger switch 23 is in contact with and is triggered by the trigger portion 11 to generate a signal.

It should be noted that because the left retaining member 371 is fixedly connected to the left inner frame plate 324 and is disposed under the left plate limiting portion 344 of the left plate 34, the upward movements of the left inner frame plate 324 and the left parts of the front inner frame plate 326 and the rear inner frame plate 327 are also prevented by the left plate limiting portion 344 of the left plate 34 that hinders the left retaining member 371.

When the touch plate 21 is released, the inner frame 32 flexibly returns to its original shape and drives the touch control unit 20 to move to the upper position so that the trigger switch 23 is not triggered by the trigger portion 11.

Because pressing a left side of the touch plate 21 will result in the same effect as pressing the right side of the touch plate 21, which is driving the touch control unit 20 to move to the lower position, details of the left side of touch plate 21 being pressed and released will be omitted herein for brevity.

Further, because the linkage unit 30 is symmetrical in the left-right direction (Y) relative to the trigger switch 23 and the trigger portion 11, pressing the left and right sides of the touch plate 21 will result in the same pressing tactility.

Figure 8:
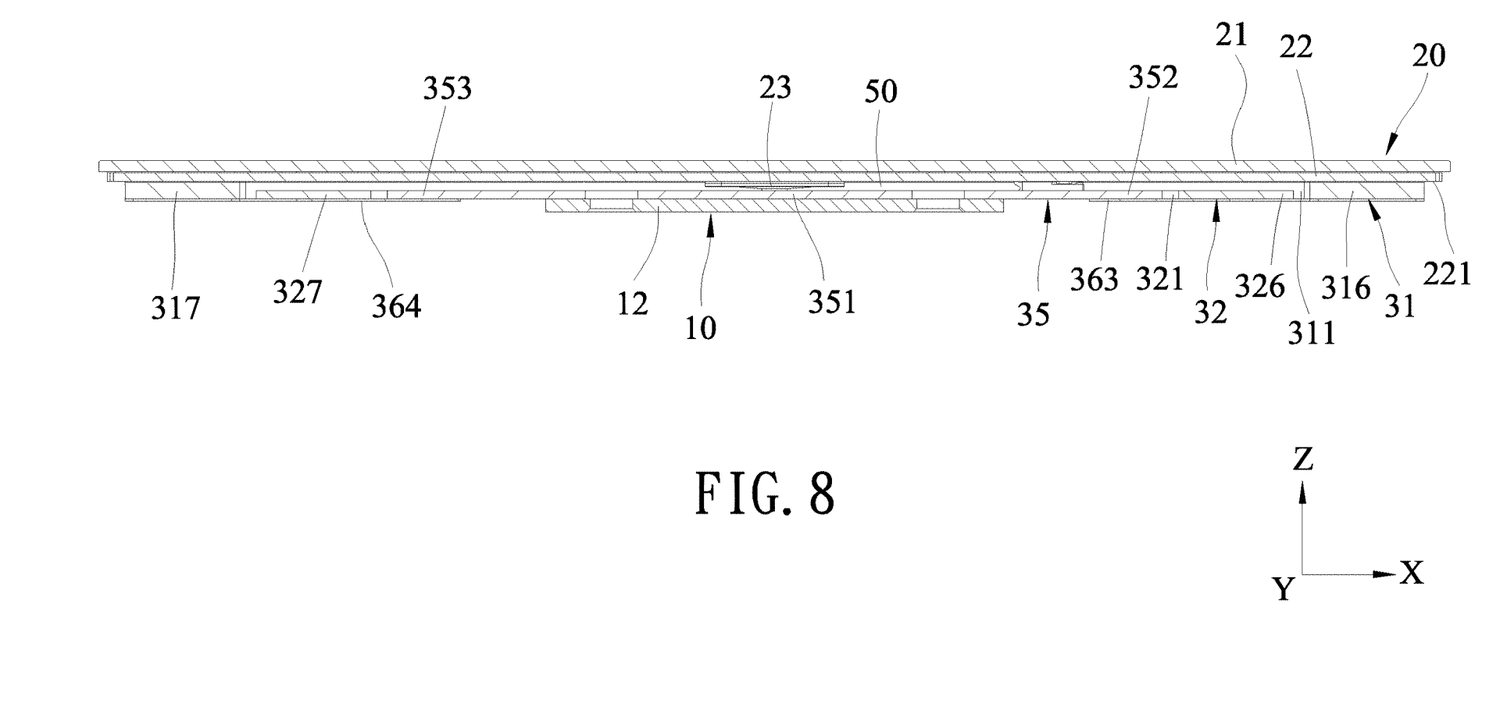
FIG. 8 is a sectional schematic view taken along line VIII-VIII from FIG. 1.

Referring to FIG. 8 in combination with FIGS. 1 and 4, when a front side of the touch plate 21 is pressed, the front outer plate 316 and front regions of the front inner frame plate 326, the left inner frame plate 324, and the right inner frame plate 325 are driven to move downwardly relative to the base unit 10. Because the left plate intermediate portion 341 of the left plate 34 fixed to the base unit 10 may serve as a left fulcrum, and because the right plate intermediate portion 351 of the right plate 35 fixed to the base unit 10 may serve as a right fulcrum, the left plate front portion 342 of the left plate 34 and the right plate front portion 352 of the right plate 35 and the front regions of the left inner frame plate 324 and the right inner frame plate 325 are deformed to bend downwardly. While the rear inner frame plate 327 and rear regions of the left inner frame plate 324 and the right inner frame plate 325 tend to move upwardly relative to the base unit 10, because the left rear linkage member 362 of the second linkage set 36 fixed between the left part of the rear inner frame plate 327 and the left plate rear portion 343 of the left plate 34 may serve as a left rear fixing point, and because the right rear linkage member 364 of the second linkage set 36 fixed between the right part of the rear inner frame plate 327 and the right plate rear portion 353 of the right plate 35 may serve as a right rear fixing point, the rear inner frame plate 327 and rear regions of the left inner frame plate 324 and the right inner frame plate 325 are prevented by the left rear linkage member 362 and the right rear linkage member 364 from moving upwardly, so as to prevent an upward movement of a rear side of the touch plate 21, thereby limiting the touch control unit 20 from wobbling forward and rearward. As the touch control unit 20 moves to the lower position, the trigger switch 23 is in contact with and is triggered by the trigger portion 11 to generate a signal.

Because pressing the rear side of the touch plate 21 will result in the same effect as pressing the front side of the touch plate 21, which is driving the touch control unit 20 to move to the lower position, details of the rear side of the touch plate 21 being pressed will be omitted herein for brevity.

Further, because the linkage unit 30 is symmetrical in the front-rear direction (X) relative to the trigger switch 23 and the trigger portion 11, pressing the front and rear sides of the touch plate 21 will result in the same pressing tactility.

In this embodiment, when a central region of the touch plate 21 is pressed, the outer frame 31 and the inner frame 32 are driven to move together with each other downwardly toward the base unit 10. By virtue of the left front linkage member 361 and the left rear linkage member 362 fixed between the left plate 34 and the bottom inner frame surface 323 of the inner frame 32, and by virtue of the right front linkage member 363 and the right rear linkage member 364 fixed between the right plate 35 and the bottom inner frame surface 323, the left plate front portion 342 of the left plate 34, the left plate rear portion 343 of the left plate 34, the right plate front portion 352 of the right plate 35, and the right plate rear portion 353 of the right plate 35 are simultaneously driven by downward movement of the inner frame 32 to bend downwardly, so the touch control unit 20 may stably move to the lower position.

The full-area touch device 1 of the disclosure has the following advantages.

1. Because the linkage unit 30 is symmetrical in the front-rear direction (X) and the left-right direction (Y) relative to the trigger portion 11 and the trigger switch 23, the trigger switch 23 may be triggered by the trigger portion 11 when any region of the touch plate 21 is pressed. Further, because pressing the left and right sides of the touch plate 21 may result in the same pressing tactility, and because pressing the front and rear sides of the touch plate 21 may result in the same pressing tactility, operation tactility of the full-area touch device 1 may be increased.

2. The full-area touch device 1 does not need a stopping and blocking structure. By virtue of the inner frame 32 being connected to the base unit 10 via the left plate 34, the right plate 35, and the second linkage set 36, wobbling and shifting of the touch control unit 20 may be limited, thereby achieving a purpose and an effect of pressing any region of a full area of the touch plate 21 to cause the trigger switch 23 to be triggered by the trigger portion 11 of the base unit 10.

3. Because the portion of the outer frame space 311 not occupied by the base unit 10, the inner frame 32, the left plate 34, and the right plate 35 is defined as the floating chamber 50, a cushioning feel may result therefrom to increase an operation feeling when a user presses the touch plate 21.

4. By virtue of the floating chamber 50 being unoccupied, a pressing force applied on the touch plate 21 may be effectively transmitted, thereby increasing a press sensitivity and enhancing a movement stability of the touch control unit 20.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A full-area touch device comprising:
   a base unit having a trigger portion;
   a touch control unit disposed over said base unit, and including
      a touch plate,
      a circuit board that is connected to a bottom side of said touch plate and that has a circuit board bottom surface opposite to said touch plate, and
      a trigger switch that is disposed on said circuit board bottom surface, that is aligned with said trigger portion, and that is configured to be triggered by said trigger portion; and
   a linkage unit disposed between said base unit and said touch control unit, symmetrical in a front-rear direction and a left-right direction relative to said trigger switch, and including
      an outer frame that defines an outer frame space, and that has a top outer frame surface connected fixedly to said circuit board bottom surface, and a bottom outer frame surface opposite to said top outer frame surface,
an inner frame that is flexible, that is disposed in said outer frame space, that defines an inner frame space, and that has a top inner frame surface and a bottom inner frame surface opposite to said top inner frame surface, a thickness of said inner frame between said top inner frame surface and said bottom inner frame surface being smaller than a thickness of said outer frame between said top outer frame surface and said bottom outer frame surface,
a first linkage set that has a plurality of linkage members fixed between said bottom outer frame surface and said bottom inner frame surface,
a left plate that is flexible, that is fixed to said base unit, and that is disposed in said inner frame space,
a right plate that is flexible, that is fixed to said base unit opposite to said left plate, and that is disposed in said inner frame space, and
a second linkage set that has a left front linkage member, a left rear linkage member, a right front linkage member, and a right rear linkage member, said left front linkage member and said left rear linkage member being fixed between said left plate and said bottom inner frame surface, said right front linkage member and said right rear linkage member being fixed between said right plate and said bottom inner frame surface;
wherein a gap is formed between said top inner frame surface and said circuit board bottom surface;
wherein said outer frame space and said inner frame space communicate with each other;
wherein a portion of said outer frame space not occupied by said base unit, said inner frame, said left plate, and said right plate is defined as a floating chamber; and
wherein said touch control unit is movable relative to said base unit, via operation of said linkage unit, between an upper position where said trigger switch is not triggered by said trigger portion, and a lower position where said trigger switch is triggered by said trigger portion.

2. The full-area touch device as claimed in claim 1, wherein:
said outer frame is rectangular;
said inner frame is rectangular and includes
a front inner frame plate and a rear inner frame plate, and
a left inner frame plate and a right inner frame plate interconnecting said front inner frame plate and said rear inner frame plate, top surfaces of said front inner frame plate, said rear inner frame plate, said left inner frame plate and said right inner frame plate cooperatively forming said top inner frame surface, bottom surfaces of said front inner frame plate, said rear inner frame plate, said left inner frame plate and said right inner frame plate cooperatively forming said bottom inner frame surface;
said left plate is disposed adjacent to said left inner frame plate, and has
a left plate intermediate portion fixed to said base unit,
a left plate front portion extending from said left plate intermediate portion toward said front inner frame plate, and protruding outwardly of said base unit, and
a left plate rear portion extending from said left plate intermediate portion toward said rear inner frame plate, and protruding outwardly of said base unit;
said right plate is disposed adjacent to said right inner frame plate, and has
a right plate intermediate portion fixed to said base unit,
a right plate front portion extending from said right plate intermediate portion toward said front inner frame plate, and protruding outwardly of said base unit, and
a right plate rear portion extending from said right plate intermediate portion toward said rear inner frame plate, and protruding outwardly of said base unit;
said left front linkage member of said second linkage set is fixed between a left part of said front inner frame plate and said left plate front portion;
said left rear linkage member of said second linkage set is fixed between a left part of said rear inner frame plate and said left plate rear portion;
said right front linkage member of said second linkage set is fixed between a right part of said front inner frame plate and said right plate front portion; and
said right rear linkage member of said second linkage set is fixed between a right part of said rear inner frame plate and said right plate rear portion.

3. The full-area touch device as claimed in claim 2, wherein:
said left plate further has a left plate limiting portion that extends from said left plate intermediate portion toward said left inner frame plate, and that protrudes outwardly of said base unit;
said right plate further has a right plate limiting portion that extends from said right plate intermediate portion toward said right inner frame plate, and that protrudes outwardly of said base unit; and
said linkage unit further includes a retaining set including
a left retaining member that is fixedly connected to said left inner frame plate and that is disposed under said left plate limiting portion, and
a right retaining member that is fixedly connected to said right inner frame plate and that is disposed under said right plate limiting portion.

4. The full-area touch device as claimed in claim 1, wherein:
a number of said linkage members is four; and
each of said linkage members has
a corner portion that is fixed to said bottom outer frame surface, and
a protrusion portion that protrudes from said corner portion and that is fixed to said bottom inner frame surface.

5. The full-area touch device as claimed in claim 1, wherein said base unit includes a base plate and an intermediate plate that is fixed to said base plate and that has said trigger portion.

* * * * *